(12) United States Patent
Chesley

(10) Patent No.: US 7,007,083 B1
(45) Date of Patent: Feb. 28, 2006

(54) REAL TIME UPDATE NOTIFICATION

(75) Inventor: Harry R. Chesley, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 593 days.

(21) Appl. No.: 09/606,257

(22) Filed: Jun. 29, 2000

(51) Int. Cl.
*G06F 15/173* (2006.01)
*G06F 15/16* (2006.01)

(52) U.S. Cl. ............... 709/224; 709/206; 709/207; 709/246

(58) Field of Classification Search ........... 709/203, 709/205, 206–207, 212, 217–219, 232, 245, 709/223–224, 246, 248
See application file for complete search history.

(56) References Cited

U.S. PATENT DOCUMENTS

| | | | | |
|---|---|---|---|---|
| 6,065,051 | A * | 5/2000 | Steele et al. ............... | 709/219 |
| 6,073,214 | A * | 6/2000 | Fawcett ....................... | 711/133 |
| 6,119,157 | A * | 9/2000 | Traversat et al. ........... | 709/220 |
| 6,151,620 | A * | 11/2000 | Madsen et al. ............. | 709/204 |
| 6,249,806 | B1 * | 6/2001 | Kohda et al. ............... | 709/206 |
| 6,327,617 | B1 * | 12/2001 | Fawcett ....................... | 709/219 |
| 6,381,610 | B1 * | 4/2002 | Gundewar et al. ........ | 707/104.1 |
| 6,415,270 | B1 * | 7/2002 | Rackson et al. ............. | 705/37 |
| 6,433,795 | B1 * | 8/2002 | MacNaughton et al. .... | 715/738 |
| 6,449,365 | B1 * | 9/2002 | Hodges et al. ............. | 379/9.02 |
| 6,453,337 | B1 * | 9/2002 | Miller et al. ................ | 709/204 |
| 6,691,153 | B1 * | 2/2004 | Hanson et al. ............. | 709/206 |
| 6,704,907 | B1 * | 3/2004 | Aoki et al. ................. | 715/530 |
| 6,728,760 | B1 * | 4/2004 | Fairchild et al. ............ | 709/217 |

OTHER PUBLICATIONS

Microsoft Computer Dictionary 5th Edition.*

Jeff Conklin and Michael L. Begeman, MCC, Software Technology Program, article entitled gIBIS: A Hypertext Tool for Exploratory Policy Discussion, ACM Transactions on Office Information System, vol. 6, No. 4, Oct. 1985, pp. 303-331.

J. Oikarinen and D. Reed memo dated May 1993 regarding Internet Relay Chat Protocol, 58 pages.

Fernando Flores, Michael Graves, Brad Hartfield and Terryj Winograd article entitled Computer Systems and the Design of Organizational Interaction, ACM Transactions on Office Information System, vol. 6, No. 2, Apr. 1988, pp. 153-172.

Beverly I. Kedzierksi, Reading 10, "Communication and Management Support in System Development Environments", Computer-Supported Cooperative Work: A Book of Readings.

(Continued)

*Primary Examiner*—Ario Etienne
*Assistant Examiner*—Hussein El-chanti
(74) *Attorney, Agent, or Firm*—Microsoft Corporation

(57) ABSTRACT

Computer method and apparatus for communicating information between a plurality of client computers by means of a communications network. A data server computer coupled to the network communicates data from the data server computer to one or more of a plurality of client computers in response to a request for data by a client computer in the form of a hypertext transfer protocol update request. The data server computer sends the data made available from the data server computer in response to a data update request from one of the plurality of client computers to said data server computer. A communications server computer coupled to the communications network for communicating the fact that the data on the server has been updated by communicating a client to client message from the client computer that updated the data on the data server computer to other client computers thereby prompting said other client computers to request updated data from the data server computer.

21 Claims, 4 Drawing Sheets

OTHER PUBLICATIONS

Thomas W. Malone, Kenneth R. Grant, Kum-Yew Lai, Ramana Rao and David Rosenblitt, Reading 12, "Semistructured Messages are Surprisingly Useful for Computer-Supported Coordination", Computer-Supported Cooperative Work: A Book of Readings.

Irene Greif and Sunil Sarin, Reading 17,"Data Sharing in Group Work", Computer-Supported Cooperative Work: A Book of Readings.

Robert H. Thomas, Harry Forsdick, Terrence R. Crowley, Richard W. Schaaf, Raymond S. Tomlinson, Virginia M. Travers and George G. Robertson, Reading 18, "Diamond: A Multimedia Message System Built on a Distributed Architecture", Computer-Supported Cooperative Work: A Book of Readings.

* cited by examiner

REAL TIME UPDATE NOTIFICATION

FIELD OF THE INVENTION

The present invention concerns a process and apparatus for transmitting information between computers and more particularly concerns a process and apparatus that utilizes two existing communications protocols to achieve real time updating of information on disparate computers.

BACKGROUND ART

Communications between users over computer networks is routinely used to perform collaborative tasks. E-mail, for example, is frequently used to allow collaborators to share ideas and share in the performance of tasks. Sending messages back and forth during a collaborative project can occur on a company wide network as well as over the Internet. As network based messaging becomes more common, network users have legitimately become concerned about the security of such communications.

Messages from outside a company maintained network are routinely screened by means of software and hardware firewalls that accept only messages conforming to certain protocols. One common protocol that is understood by such firewalls is the hypertext transfer protocol (HTTP). A second commonly recognized protocol is the Internet relay chat protocol (IRC). The hypertext transfer protocol is commonly used by server computers to communicate data to client computers. One feature of HTTP is the typing and negotiation of data representation, allowing systems to communicate independently of the data being transferred. A client locates a server by means of a unique identifier and then polls the server for data using the HTTP protocol. The process of updating the contents transmitted to the client is dependent on the client periodically polling the server for new information.

The Internet relay chat (IRC) protocol has evolved over a number of years for use in text based conferencing and is also recognized by security firewalls commonly used to protect networks and/or computers from undesirable communications. A server forms the backbone of an IRC communications link. Multiple clients identified by a unique nickname connect to the server and communicate with each other. A channel within the IRC construct is a group of one or more clients which all receive messages addressed to that channel. Further details of the IRC protocol are contained in RFC (request for comments) 1459 of the network working group.

SUMMARY OF THE INVENTION

The present invention provides a new and improved means of communicating between computers which utilizes aspects of two existing communications protocols. Use of the invention allows real time updates for users who are interested in data which has recently been updated. An exemplary use of the invention is with a database that is continually being updated by inputs from multiple data sources. When a client makes a change to the database, in addition to updating the server that stores the database, an update notice is transferred through a real time update channel that indicates to other clients that the database has been updated. Any of a possible large number of clients can respond to this information by polling the server for a more up to date database record or query result. Other applications requiring updated information can benefit through practice of the invention.

To prevent difficulties associated with obtaining permissions for new protocols to pass through firewalls, an existing protocol such as IRC may be used as the real time update channel. Each IRC channel corresponds to a section of data. When the channel's section is updated, it notifies interested clients to poll the HTTP server to receive updated data.

An exemplary process of the invention provides a means of communicating information between a plurality of client computers. Data is provided on a data source such as a server computer and data on the server computer is communicated to one or more of a plurality of client computers in response to a request for data by the client computers. Periodically the data on the server computer is updated by sending data from one of the plurality of client computers to the server computer or alternately by the server software performing an update. The fact that the data on the server has been updated is made known to the clients by means of an update message indicating that updated data on the server computer is available. This allows the other client computers to determine if they should access the updated data on the server computer.

These and other objects, advantages and features of the invention will become better understood from the following detailed description of an exemplary embodiment of the invention which is described in conjunction with the accompanying drawings.

EXEMPLARY EMBODIMENT FOR PRACTICING THE INVENTION

Figure 1:
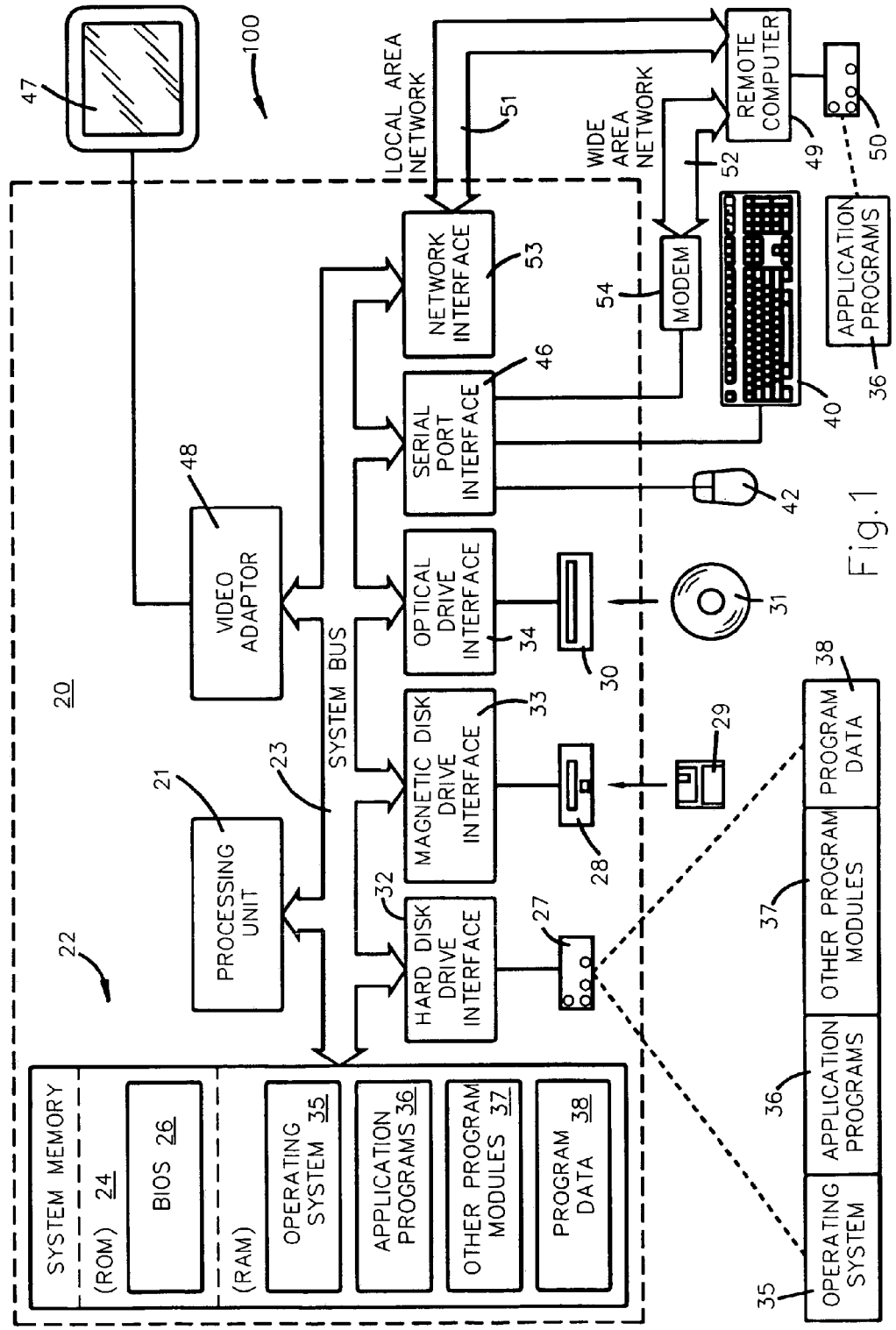
FIG. 1 is a exemplary data processing system for use in practicing the invention.

With reference to FIG. 1 an exemplary data processing system 100 for practicing the disclosed invention includes a general purpose computing device in the form of a computer system 20, including one or more processing units 21, a system memory 22, and a system bus 23 that couples various system components including the system memory to the processing unit or units 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that help to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35 wherein each of the multiple processors 21 of the computer system executes one or more program threads, one or more application programs 36, other program modules 37, and program data 38. A user may enter commands and information into the computer system 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49 that also includes a plurality of processors. The remote computer 49 may be another personal computer, a server, a router, a network PC, a peer device or other common network node, and typically includes many or all of the elements described above relative to the computer system 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device of the remote computer 49. It will be appreciated that the network connections shown are exemplary and other means of establishing a communications link between the computers may be used.

Figure 2:
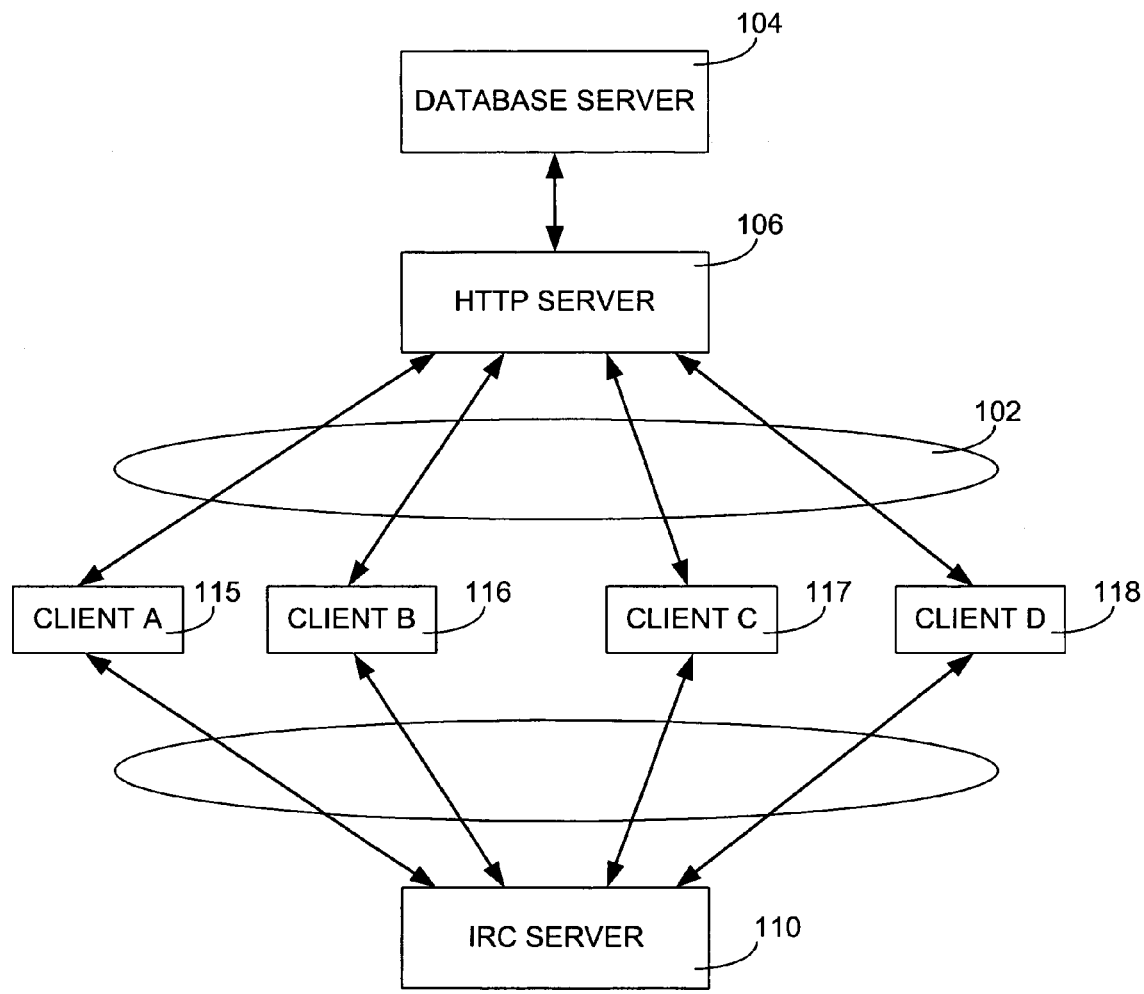
FIG. 2 is a schematic depiction showing a peer to peer real time update notification process.

FIG. 2 illustrates a representative computer configuration for communicating information between a plurality of client computers 115,116,117,118 coupled to a network 102 such as the local area network 51 or the wide area network 52 shown in FIG. 1. Data from a database server 104 is made available to the clients 115,116,117,118 by a server computer 106. This data is communicated from the server computer 106 to one or more of the client computers 115,116,117,118 in response to a request by a client computer 115,116,117,118 for the data. At periodic intervals the data on the database stored on the database server 104 is updated. After such an update of the data within the database, the server computer 106 presents updated information in response to a client request for data.

One means of updating the data within the database 104 is for one of the clients 115,116,117,118 to provide data to the server computer 106 which in turn makes that data part of the database by means of database management software executing on the database server 104. The client 115,116, 117,118 that has updated the data in the database 104 communicates the fact that the data on the server has been updated to other clients 115,116,117,118. A client to client message from the client computer 115,116,117,118 that updated the data is sent to other client computers on the network 102. In response to receipt of such a client to client message the clients can then request the updated information from the server computer 106.

A typical application of the invention is a use wherein the database server 104 of FIG. 2 is one or more computers, the server 106 defines a node on the Internet, and the clients 115,116,117,118 are connected to the server 106 by means of the Internet. Such a system employs the HTTP protocol to implement client/server communications. This protocol, in combination with active server page scripts and ODBC technology provides widely distributed clients 115,116,117, 118 access to a central scalable database of information. Without more, however, such a system does not provide change notification to the clients 115,116,117,118 concerning changes to the database and therefore prior art client polling of the server is required for the clients to have access to updated data.

Use of a separate, multi-client, real-time update protocol allows the clients 115,116,117,118 to notify the other clients when they make a change to the database stored on the database server 104. The IRC protocol (Internet Relay Chat) which was originally designed for text chat, is the preferred means of messaging the other clients 115,116,117,118. When a client makes a change to the database, the client first updates the database. Synchronization facilities in the database management software running on the database server 104 ensure orderly updating of the information in the database. The client then sends a change notification to a real-time channel that is implemented by means of an IRC server 110. All the other clients that are currently on-line monitor notices from the IRC server 110 and update their local information appropriately by making an update request from the HTTP server 106 for updated data from the database server 104.

In one embodiment, for increased efficiency, the database stored on the server 104 is divided into multiple distinct areas. For each area, there is a real-time channel defined. All clients who are interested in that area of the database open a connection to the real time IRC channel for that area. Thus, only those clients 115,116,117,118 who are active on-line and that have an interest in that database area are sent update notifications. The notification may optionally contain additional information detailing exactly what data was changed, so that clients interested in the area, but not in the particular data that was changed can ignore the notification and not seek an update from the server 106.

ALTERNATE EMBODIMENT OF THE INVENTION

Figure 3:
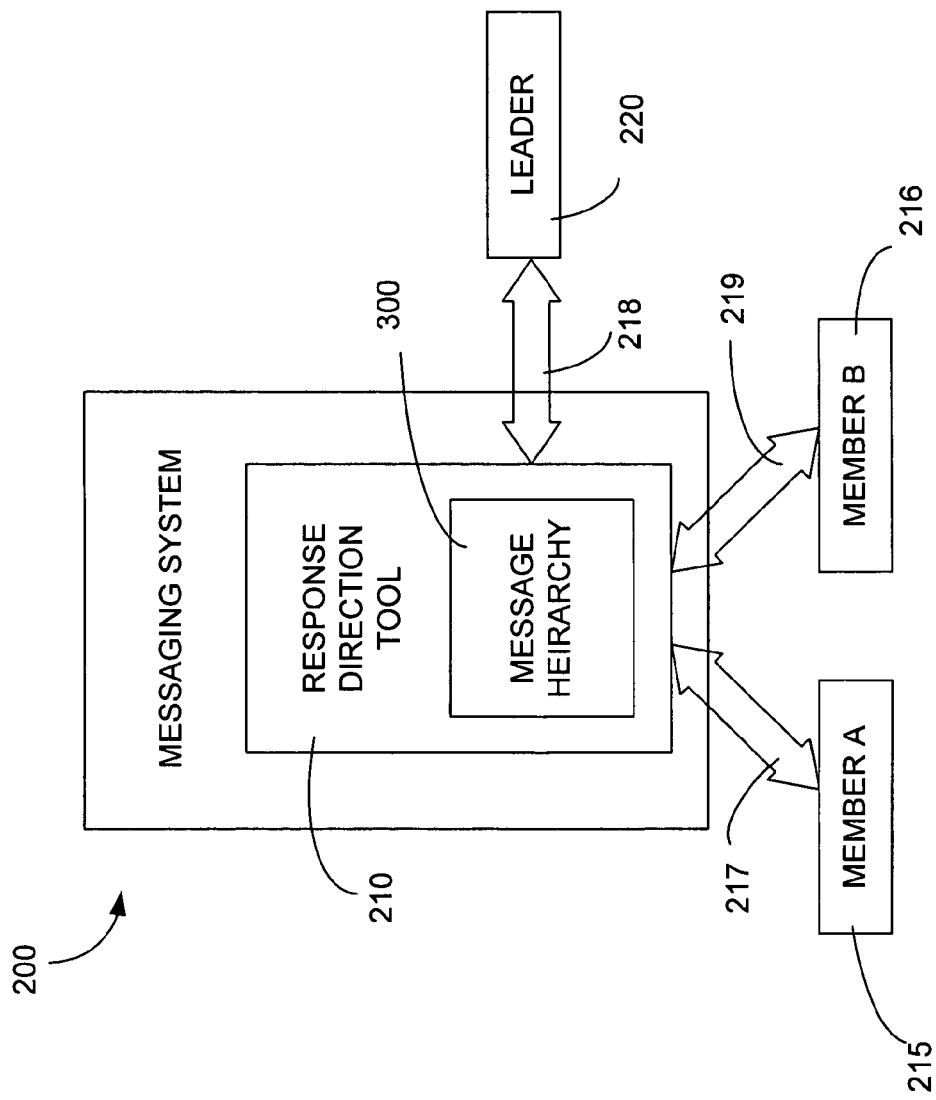
FIG. 3 is a depiction of a use of the invention with a goal-directed messaging system.

Referring now to FIG. 3, a collaborative messaging system 200 is depicted that features a response direction tool 210. Project team members 215,216 send and receive electronic messages 217,219 via the messaging system 200. The messages relate to a given project that progresses along a time line to completion. A team leader 220 also sends and receives messages 218 via the messaging system. Messages 217,219, 218 are stored in a message hierarchy 300 within the messaging system. A response direction tool 210 accesses the message hierarchy 300 and interfaces with the members 215,216. The team leader 220 controls the response direction tool 210.

Figure 4:
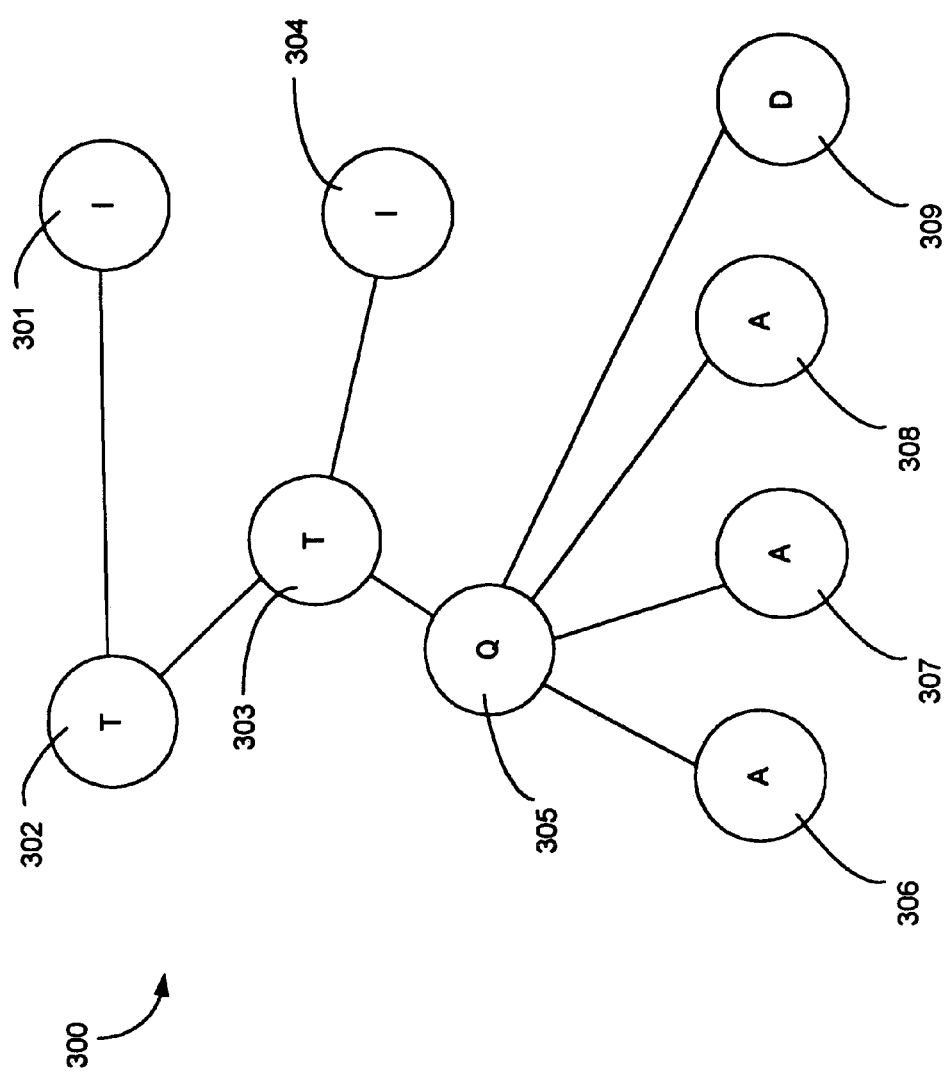
FIG. 4 is a message hierarchy of the FIG. 3 messaging system.

FIG. 4 depicts a representation of a message hierarchy 300. Messages that have been posted in the messaging system 200 are catalogued by the leader 220 into a message hierarchy tree structure 300 wherein messages are represented by nodes 301–309. Such a message hierarchy is stored for example on a server computer that is accessible from member computers by means of network communications. Related messages are represent by nodes that are connected such as node 305 and its sub-nodes 306–309. In general, nodes are added to the hierarchy at the edges or leaves. But is its also possible to insert a node between an existing node and that node's parent.

The nodes are assigned a type and a goal by the leader 220 by communicating with the response direction tool 210. The response direction tool accesses the hierarchy 300 to complete the assignment. The type and goal assigned to a node define the types of responses to the message represented by the node that will be deemed acceptable by the response direction tool 210. As a project progresses, the team leader changes the node goal to tailor the responses to ones that expedite completion of the project. Generally, the further a project moves toward completion, the more limited the desired responses from team members. By limiting the types of responses, the response direction tool 210 can prevent the introduction of new ideas and proliferation of discussion that may set a project back when a decision is necessary. The response direction tool 210 screens the members' messages 217,219 and limits them to those recommended by the node type and goal of the message at hand. In an exemplary embodiment, the response direction tool 210 displays a cautionary message when an inappropriate response is received from a member 215,216, but does not prevent the member from sending the message.

The goal directed messaging system of FIGS. 3 and 4 is implemented by means of network supported communications between the members 215,216 and the leader 220. The leader can communicate by means of a real time update message system that makes use of the IRC protocol described above. Additionally, each time a member 215,216 sends a message to the leader, the fact that an update has occurred can also be communicated to the other members that are participating in the collaborative effort. As in the previous example of the database (FIG. 2) the IRC channels could be used for different portions of the hierachical structure of FIG. 4. Each node could have its own channel or alternatively, different sections of the tree are assigned their own channel.

It is appreciated that although an exemplary embodiment of the invention has been described with a degree of particularity, it is the intent that the invention include modifications and alterations from the disclosed design falling within the spirit or scope of the appended claims.

What is claimed is:

1. A method of communicating information between a plurality of client computers comprising the steps of:
   providing data on a data source and communicating the data from the data source to one or more of a plurality of client computers in response to a request for data by said one or more client computers through a http server;
   updating the data on the data source by sending data from one of the plurality of client computers to said data source through the http server; and
   communicating a fact that the data available on the data source has been updated by automatically communicating an IRC message from the one client computer that updated the data to other client computers via an IRC server prompting said other client computers to automatically access the updated data from the data source through the http server.

2. The method of claim 1 wherein the data source and the plurality of client computers communicate information by means of a hypertext transfer protocol wherein a client computer periodically polls the data source and further wherein said client computers poll the data source in response to a client to client message concerning an updating of data on the data source from another client.

3. The method of claim 1 additionally comprising the step of providing a communications interrupt server which communicates client to client messages between multiple client computers.

4. The method of claim 1 wherein the client to client message is formatted in accordance with an internet relay chat protocol.

5. The method of claim 4 wherein the data source maintains a database of information and wherein different portions of the database are assigned a unique internet relay chat channel.

6. The method of claim 4 wherein the data source maintains a goal based message hierarchy having message nodes and wherein updates to one or more nodes in a group of such nodes are assigned to an internet relay chat channel.

7. The method of claim 4 additionally comprising the step of providing a communications interrupt server which communicates messages between multiple client computers by means of said internet relay chat protocol.

8. The method of claim 1 wherein the data source comprises a server computer.

9. A computer readable medium containing computer instructions for performing the steps of:
   providing data on a data source and communicating the data from the data source to one client computer of a plurality of client computers through a http server in response to an IRC request for data by said one client computer; and
   updating the data on the data source and automatically communicating by an IRC message the fact that the data available on the data source has been updated by communicating an update message from said one client computer to said plurality of client computers automatically through an IRC server prompting said plurality of client computers to automatically access the updated data from the data source through the http server.

10. The computer readable medium of claim 9 wherein the data source and the plurality of client computers communicate information by means of a hypertext transfer protocol wherein a client computer periodically polls the data source and further wherein said client computers poll the data source in response to an update message concerning an updating of data on the data source.

11. The computer readable medium of claim 9 additionally comprising the step of providing a communications interrupt which communicates update messages between multiple client computers.

12. The computer readable medium of claim 9 wherein the update message is formatted in accordance with an internet relay chat protocol.

13. The computer readable medium of claim 12 additionally comprising the step of providing a communications interrupt which communicates messages between multiple client computers by means of said internet relay chat protocol.

14. The computer readable medium of claim 9 wherein the data source comprises a server computer.

15. A method of communicating information between a plurality of client computers comprising the steps of:
   providing data on a http server computer and communicating the data from the http server computer through the http server computer to a single client computer of a plurality of client computers in response to a request for data by said single client computer; and
   automatically updating the data on the http server computer and then automatically communicating a fact that the data available on the http server has been updated by communicating an IRC update message from said single client computer to said plurality of client computers through an IRC server to prompt said plurality of client computers to automatically access the updated data from the http server computer.

16. The method of claim 15 wherein the update message is formatted in accordance with an internet relay chat protocol.

17. The method of claim 16 wherein certain specified clients are assigned internet relay chat protocol channels to allow the update message to be targeted at certain clients.

18. The method of claim 15 wherein the server computer stores a message hierarchy in a goal directed messaging system for tabulating messages from multiple clients and wherein the update message indicates the message hierarchy has been updated.

19. The method of claim 18 wherein the message hierarchy is divided into nodes which form groups of one or more nodes and wherein the update message is in the form of an internet relay chat protocol and wherein node groups are assigned different internet relay chat channels.

20. The method of claim 15 wherein the server computer stores a database for storing information made available from multiple clients and wherein the update message indicates the database has been updated.

21. The method of claim 20 wherein the database is divided into data portions and said data portions are assigned channels in an internet relay chat protocol that implements the update message.

* * * * *